(12) United States Patent
Funck et al.

(10) Patent No.: US 7,036,677 B1
(45) Date of Patent: May 2, 2006

(54) PRESSURISED TANK AND METHOD FOR MAKING SAME

(75) Inventors: Ralph Funck, Deutschherrnstrasse 61, D-67661, Kaiserslautern (DE); Joachim Hausmann, Kaiserslautern (DE)

(73) Assignee: Ralph Funck, Kaiserslautern (DE)

( * ) Notice: Subject to any disclaimer, the term of this patent is extended or adjusted under 35 U.S.C. 154(b) by 10 days.

(21) Appl. No.: 10/048,878

(22) PCT Filed: Jul. 13, 2000

(86) PCT No.: PCT/DE00/02326

§ 371 (c)(1),
(2), (4) Date: May 1, 2002

(87) PCT Pub. No.: WO01/11284

PCT Pub. Date: Feb. 15, 2001

(30) Foreign Application Priority Data

Aug. 7, 1999 (DE) ................................. 199 37 470

(51) Int. Cl.
*B65D 1/16* (2006.01)
(52) U.S. Cl. ..................................................... 220/581
(58) Field of Classification Search ................. 220/586
See application file for complete search history.

(56) References Cited

U.S. PATENT DOCUMENTS

| | | | | |
|---|---|---|---|---|
| 3,608,767 A | * | 9/1971 | Elliot et al. ................. | 220/4.12 |
| 4,044,184 A | * | 8/1977 | Ashida et al. ............... | 428/113 |
| 4,333,671 A | * | 6/1982 | Holko ..................... | 285/148.12 |
| 5,197,628 A | | 3/1993 | Phan et al. .................. | 220/589 |
| 5,564,587 A | * | 10/1996 | Falk et al. ................... | 220/501 |
| 5,644,919 A | | 7/1997 | Baker et al. ................. | 62/45.1 |

FOREIGN PATENT DOCUMENTS

| | | |
|---|---|---|
| DE | 79750 | 2/1971 |
| DE | 3922577 A | 1/1991 |
| DE | 69101588 T | 12/1991 |
| EP | 023605 A | 8/1987 |
| EP | 0333013 A | 9/1989 |
| EP | 0635672 A | 1/1995 |
| EP | 0810081 A | 12/1997 |
| WO | WO9210702 A | 6/1992 |
| WO | WO9220954 A | 11/1992 |

\* cited by examiner

*Primary Examiner*—Stephen Castellano
(74) *Attorney, Agent, or Firm*—Paul & Paul (57) ABSTRACT

The present invention relates to a pressure vessel for storage of solid, liquid and/or gaseous media under an operating pressure above atmospheric pressure, wherein the pressure vessel encloses a hollow space provided for storage of the medium, and is provided with at least one connector for loading and/or unloading. Because the pressure vessel is composed at least in part of a tube that in turn is manufactured from a fiber-reinforced thermoplastic, wherein the thermoplastic material contains more than 10% by volume of fibers with an average fiber length over 50 mm, the pressure vessel has a low weight and a very good resistance to corrosion and resistance to chemically aggressive media, yet it nevertheless withstands the mechanical stresses of the normal high operating pressures up to 25 Mpa.

16 Claims, 7 Drawing Sheets

PRESSURISED TANK AND METHOD FOR MAKING SAME

The invention relates to a pressure vessel for storing solid, liquid and/or gaseous media under an operating pressure above atmospheric pressure, wherein the pressure vessel comprises a hollow space for storing the medium and at least one connection for loading and/or unloading.

Such pressure vessels are known in many embodiments in the prior art and they have to withstand the mechanical requirements of internal and external pressure and the further mechanical, physical (temperature) and chemical stresses. A suitable material for manufacturing such pressure vessels is steel. Steel vessels are mostly composed of a cylindrical tank with a base plate or base cap and a lid that is generally configured like a corresponding base cap, particularly when the pressure vessel is retained or kept in a horizontal position (with a horizontal axis).

Such steel containers basically have the advantage of a high degree of mechanical strength and thus a high degree of pressure resistance and also good thermal resistance. On the other hand, the chemical resistance of steel to corrosive substances is poor, and for this reason steel vessels are generally unsuitable for containing chemically aggressive media, or else they must be provided with an expensive internal coating. Steel containers are also relatively susceptible to the effects of external weathering, so additional coating or painting has to be provided. Lastly, steel vessels are relatively heavy, and manufacturing by welding together lids and the main cylindrical part is relatively complex.

If, instead of steel, another metal is used that has better chemical resistance and corrosion resistance, such metals are often more expensive, more difficult to work, or both.

Pressure vessels of fibre-plastics composites with thermosetting matrix systems are also already known.

For example, European patent EP-0 810 081 A1 relates to a "Pressure Vessel and Method of Manufacturing Same". This describes how a closed envelope layer that is composed of plastics is covered with a fibre-plastics composite in a fibre wrapping method. An analogous principle for a container is described in European patent EP-0 333 013 A1 "Pressure Vessels". In this case too, an envelope layer is surrounded with fibres such that the strengthening shell withstands the mechanical stresses.

International publication WO 92/20954 "glass-fibre reinforced plastic container, method and apparatus for manufacturing such container" describes a glass-fibre reinforced container and a method for the manufacture thereof, wherein the container is composed of two half-shells that are connected together in the cylindrical region by gluing. The half-shells are manufactured by the resin injection method using shaping tools, wherein thermosetting plastics are used. Because of the half-shell technique, variation of the length of the containers is only possible with a great deal of expense (a new tool).

Other known types of design propose the use of shells of fibre-plastics composite that are arranged in some areas on an envelope layer, wherein the fibre orientation of the shells is principally in the peripheral direction. The envelope layer thus assumes the strengths existing in the longitudinal axis of the container, while the shell assumes the strengths in the peripheral direction of the container.

All designs are manufacturing methods known up until now for plastics pressure vessels are either too complex and thus expensive to manufacture, do not conform to the requirements for sealing capacity or mechanical stress, are too heavy or have external surfaces that are not optically satisfactory. In addition because of production requirements, with most containers the connections for loading and/or unloading are arranged centrally on the vessel bottom.

With respect to this prior art, the object of the present invention is to provide a pressure vessel that is relatively simple to manufacture, has a low weight and very good corrosion resistance and degree of resistance to chemically aggressive media, but nevertheless withstands mechanical stresses from the normal high operating pressures up to 25 Mpa.

This object is solved in that the pressure vessel is at least in part composed of a tube that again is manufactured from a fibre-reinforced thermoplastic material, wherein the thermoplastic material contains more than 10% by volume of fibres, with an average fibre length of more than 50 mm.

Fibre-reinforced thermoplastics and the use thereof in different technical fields have been known for a long time. Up until now, such fibre-reinforced thermoplastics have not been used, or in any case not used to any significant degree, for pressure vessels. Although according to the choice of thermoplastics material, the known fibre-reinforced thermoplastics have the advantage of a certain degree of chemical resistance and corrosion resistance, nevertheless until now the mechanical properties of the thermoplastics materials with fibre-reinforcement usually used is still so unsatisfactory that practically no advantages have been obtainable in manufacturing sufficiently pressure resistant vessels from such materials. In particular, for sufficient pressure resistance only relatively expensive and heavy plastics could be used, and furthermore only with relatively large wall thickness, so above all because of the large wall thickness there was no weight advantage compared to corresponding pressure vessels made from steel or other metals. The costs for corresponding masses of thermoplastic fibre-reinforced material are correspondingly high, so such materials have not in any case become acceptable for pressure vessels.

The inventors of the subject-matter of the present application have discovered, however, that the wall thickness of the thermoplastic material for pressure vessels can be significantly reduced when the thermoplastic material is filled with at least 10% by volume of fibres that on average have a length of at least 50 mm. The tensile strength of the thermoplastic material, crucial for pressure vessels, is evidently significantly increased by the on average relatively long fibres. At the same time, the manufacture of an important part of the pressure vessel in the shape of a tube is particularly simple, as tubes of relatively large lengths can be extruded and then need simply to be cut to a desired length in order to find application as the cylindrical main part of a pressure vessel.

The lids sitting on the two ends of such a tubular section are also preferably made from a fibre-reinforced plastics material; preferably they are of the same thermoplastic matrix material as the tube. This makes very simple and secure welding of the lid and tube possible. Furthermore, the features of preferred embodiments of the pressure vessel according to the invention are described herein. The pressure vessel of fibre-plastics composites according to the invention are in no way surpassed by conventional steel or aluminum vessels with respect to pressure technology suitability, moreover they offer decisive advantages such as low weight and increased corrosion resistance. By suitable combination of a plastics material as the matrix with high strength fibres as reinforcement, a versatile material is obtained, wherein by selection of a suitable reinforcement structure, tailor-made material properties can be established.

It has thus proved particularly advantageous for pressure vessels when the orientation of the fibres within the thermoplastic matrix is not completely random, but instead when a certain preferred direction is configured that on average demonstrates a greater orientation in the peripheral direction. A configuration of the pressure vessel according to the invention is particularly preferred in which the tube forming the main part of the pressure vessel is composed of a fibre-reinforced plastics, in which averaged over a quadrant between 0° and 90° relative to the tube axis, or one parallel thereto, the fibres have an angle of orientation in the range of 45° to 65°, preferably of 50° to 60°, and particularly approximately 54° to 55°.

Polyethylene, polypropylene, polyamide, polyketone, polyvinyl chloride, poly-4-methyl pentene-1, polyacetal, polymethyl methacrylate, polystyrene, styrene/acrylnitrile copolymer, polycarbonate and/or acrylnitrile butadiene styrene are suitable as matrix materials, for example, wherein this list is not exhaustive.

Suitable fibres are glass fibres, aramide fibres, carbon fibres, metal fibres, ceramic fibres and/or polymer fibres or natural fibres.

Advantageously, the tube has a circular cross-section. If a non-circular cross-section were provided for the tube, when pressure is applied the wall of a pressure vessel manufactures from such a tube would distort to a greater or lesser extent towards the cylindrical cross-section, as for a given tube circumference, the cylindrical shape offers the greatest volume.

Correspondingly, the lids sealing the tube at both ends are also configured circular, but can, however, be domed towards the inside or the outside. An embodiment is particularly preferred in which the lid has a tube connector, the diameter of which is matched to the cross-section of the tube forming the main part of the pressure vessel, preferably such that the tube connector can be inserted telescopically, possibly with press-fitting, into the tube forming the main part of the pressure vessel. The length of overlap of the tube connector and the tube is preferably between 5 and 100 mm, and the tube connector is welded over as large a surface area as possible, to the tube end into which it is inserted. This can be, for example, by friction welding, butt-welding, ultrasonic welding, or the like.

Alternatively, the lids and tube can also be stuck together. A lid with a tube connector could also be provided with a thread on the tube connector, or a type of bayonet closure with corresponding opposite parts on the tube forming the main part of the pressure vessel, in this case, however, the additional arrangement of a seal between two touching and completely encircling surfaces of the lid and the tube is advantageous or necessary.

The lids can be injection moulded or pressed parts, and preferably, although not absolutely necessarily, also of a fibre-reinforced plastics, wherein the fibres in the lids can nevertheless be of a shorter length, for example on average between 0 and 30 mm, and wherein the lids preferably have a greater wall thickness and/or have strengthening ribs running across the lids on their inside or outside surface.

Apertures or connecting pieces for loading and unloading the vessel are preferably also provided on one of the two lids of the pressure vessels. When a pressure vessel is to be used in an upright position, it is advantageous to provide appropriate feet as extensions on one lid, or to use an inwardly domed lid on the bottom of the vessel such that the edge thereof overall provides a secure stand for the vessel.

With respect to the method for manufacturing a pressure vessel for the storage of solid, liquid and/or gaseous media under an operating pressure above atmospheric pressure, the object of the invention is solved by the following steps:

a) Manufacture of a tube from a fibre-plastics composite with a thermoplastic matrix, in which the fibres used make up at least 10% by volume of the composite material, and have an average length of more than 50 mm, b) Reduction or respectively cutting of a tube piece to the desired length, c) Manufacture of plastics lids that can seal the ends of the tube, and d) Connection of the tube to the plastics lids such that they tightly seal the ends of the tube.

The tube can, for example, be manufactured using a wrapping and/or pull-winding method. It is moreover possible to manufacture the tube firstly with randomly orientated fibres and subsequently in a further extrusion process to again expand the tube, possibly using heating, wherein by means of the expansion the fibres arranged randomly in the wall of the tube are preferably orientated in the peripheral direction, or respectively obtain a greater component in the peripheral direction, in order to optimise the material properties of the tube in this way for use as the wall of a pressure vessel. The relative expansion of the tube should be between 10% and 50%, preferably 20% to 30%.

Further aspects of manufacturing will be evident from the dependent claims 15 to 18, and also from the features of the finished pressure vessel as defined by claims 1 to 13.

By using a tube of fibre-plastics composite with a thermoplastic matrix, with long, preferably orientated fibres results in the tube having only a low intrinsic weight. By using the fibre-plastics composite described, the vessel withstands mechanical stresses and additionally serves, for example with an inner, fibre-free or low fibre layer, as a diffusion barrier. The use of a diffusion resistant envelope layer thus becomes superfluous. The materials are furthermore not greatly susceptible to corrosion.

By manufacturing the tube from fibre-plastics composite in different lengths, and appropriate sealing with the two lids, pressure vessels with different storage capabilities can be produced in the easiest possible manner.

The tube and lid can be produced with good external surfaces and visually very satisfactorily, so subsequent covering over or processing can be eliminated.

As thermoplastic-based matrix systems are used, the vessel according to the invention can be easily re-cycled, for example, by chopping up and melting down again.

In a further embodiment, the tube can be provided with an aperture in the cylindrical part for loading and unloading the vessel. This design has the advantage that an aperture insert or connector in the form of an insertable piece can be simply inserted from the inside prior to assembly of the lid. The design has, for example, the advantage that in the case of vessels mounted lying down, liquid media can be completely drained through this aperture.

In a further embodiment, the tube can be constructed from a plurality of parts. With the multi-part design of the envelope layer it must, however, be ensured that the individual parts are suitably connected to one another in a gas-tight manner.

The multi-part design has the advantage, for example, that an intermediate piece can be inserted into the tube area, into which drainage apertures are integrated.

In a further embodiment, the tube can be designed with an inwardly domed lid. With such a configuration of the lid there is, for example, the advantage that the vessel has a secure stand without additional standing surfaces having to be fitted.

By means of the method according to the invention, vessels can be produced that demonstrate the advantageous actions, functions and effects described hereinabove to which full reference has been made and are hereby referred to.

The tube can, for example, firstly be manufactured in the shape of a relatively long tube. The individual tubes can be detached from the existing tube in the desired lengths. Preferred methods for manufacturing the tube are, inter alia, but not exclusively, the wrapping or pull-winding method.

Preferred methods for manufacturing the lid are, inter alia, but not exclusively, injection moulding or pressing methods.

The appropriately shortened tube is subsequently connected to the two lids. Preferred methods for connecting the lid to the tube are, inter alia, but not exclusively, welding and/or gluing and/or form fitting, possibly with arrangement or clamping a preferably elastic seal between the sealing surfaces of the lid and the tube.

According to the invention, the operating pressure of the media stored in the vessel is less than 25 Mpa (250 bar), preferably 0.1 to 6 Mpa (1 to 60 bar). The corresponding bursting pressure then corresponds to the value of the respective operating pressure multiplied by 1.1 to 4.

The media to be stored can be air, oxygen, nitrogen, carbon dioxide, propane, natural gas, hydrogen or other technical gases or liquids or the like. The invention is not limited to a particular type of stored gases and/or liquids.

According to a further aspect of the invention, a vessel as described hereinabove, that is manufactured in particular according to a method according to the invention can be used for different purposes. Examples of possible applications are, for example and not exhaustively, use as a pressurised container for safety systems (for example, an airbag), as a pressurised container for combustible gases or as a compressed air tank.

The invention will hereinafter be described in more detail with reference to examples of embodiments, referring to the attached drawings. In these is shown, in.

Figure 1:
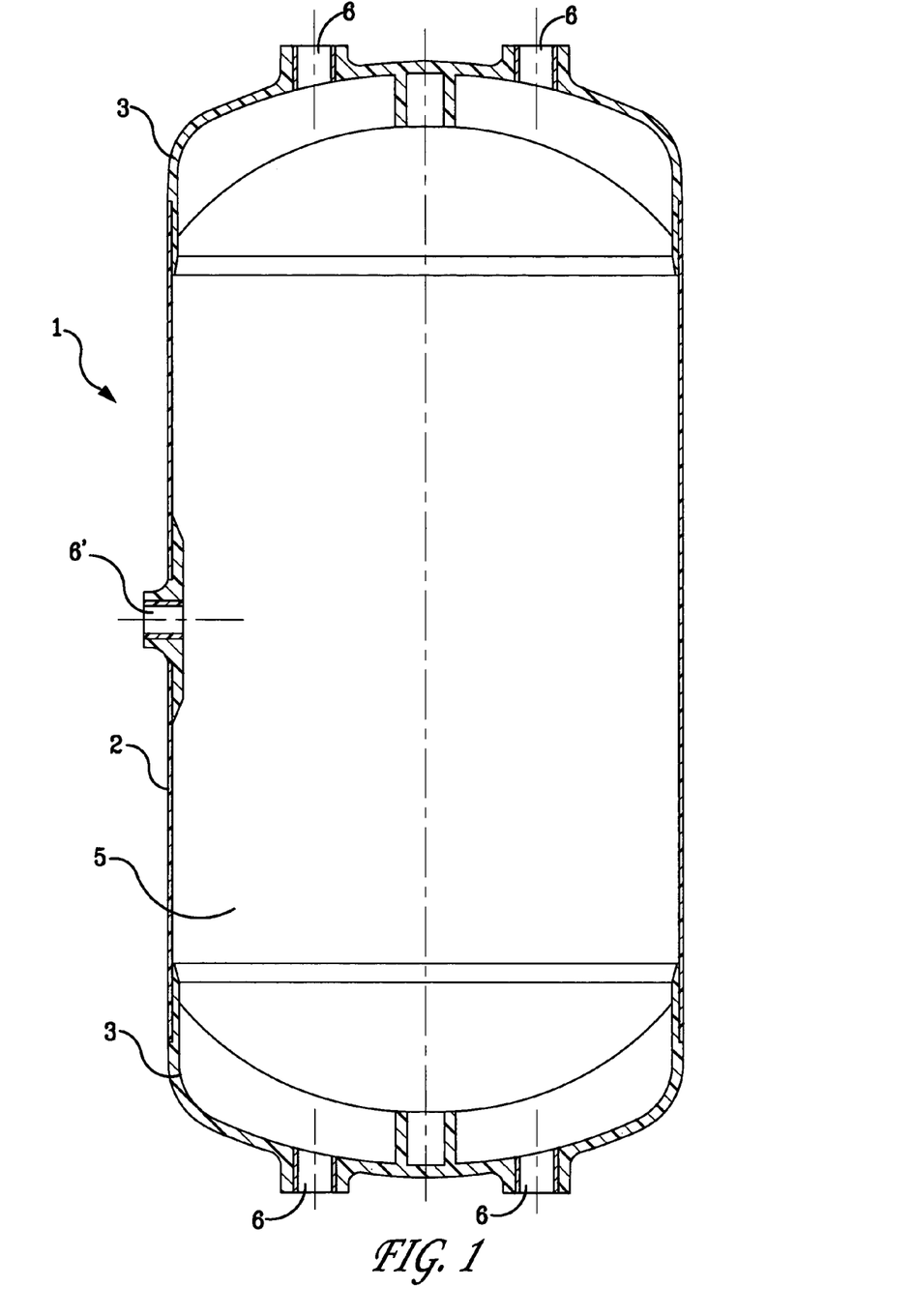
FIG. 1 a schematic cross-section of the vessel according to a first embodiment with loading and unloading apertures in both lids and in the cylindrical vessel part, FIG. 2 a schematic cross-sectional view of the vessel according to the invention according to a second embodiment with a centrally arranged loading and unloading aperture in the lid, FIG. 3 a schematic cross-sectional view of the vessel according to the invention according to a third embodiment with additional loading and unloading apertures in the cylindrical part, FIG. 4 a schematic cross-section view of the vessel according to the invention according to a fourth embodiment with a vessel base domed towards the inside, FIG. 5 a pressure vessel according to the invention with tube ends turned inwards, FIG. 6 a threaded connector 11 inserted into an aperture of the vessel, FIG. 7 a detail view analogous to FIG. 6 with an aperture connector or closure that has an integrated thread 13, and FIG. 8 a sectional view and a plan view of a vessel lid 3 with a pressure-relief joint 14.

In FIG. 1 a vessel 1 for storing a pressurised gas is shown schematically in cross-section. The vessel 1 connected together from a tube 2 of fibre-plastics composite and two lids 3 of fibre-plastics composite such that they enclose a hollow space 5 provided for storage of the gas. The tube 2 that is sealed at the ends respectively with a lid 3 can be loaded and/or unloaded via the connectors 6. In the tube 2 there is located a further connector 6' for loading and/or unloading the vessel.

Figure 2:
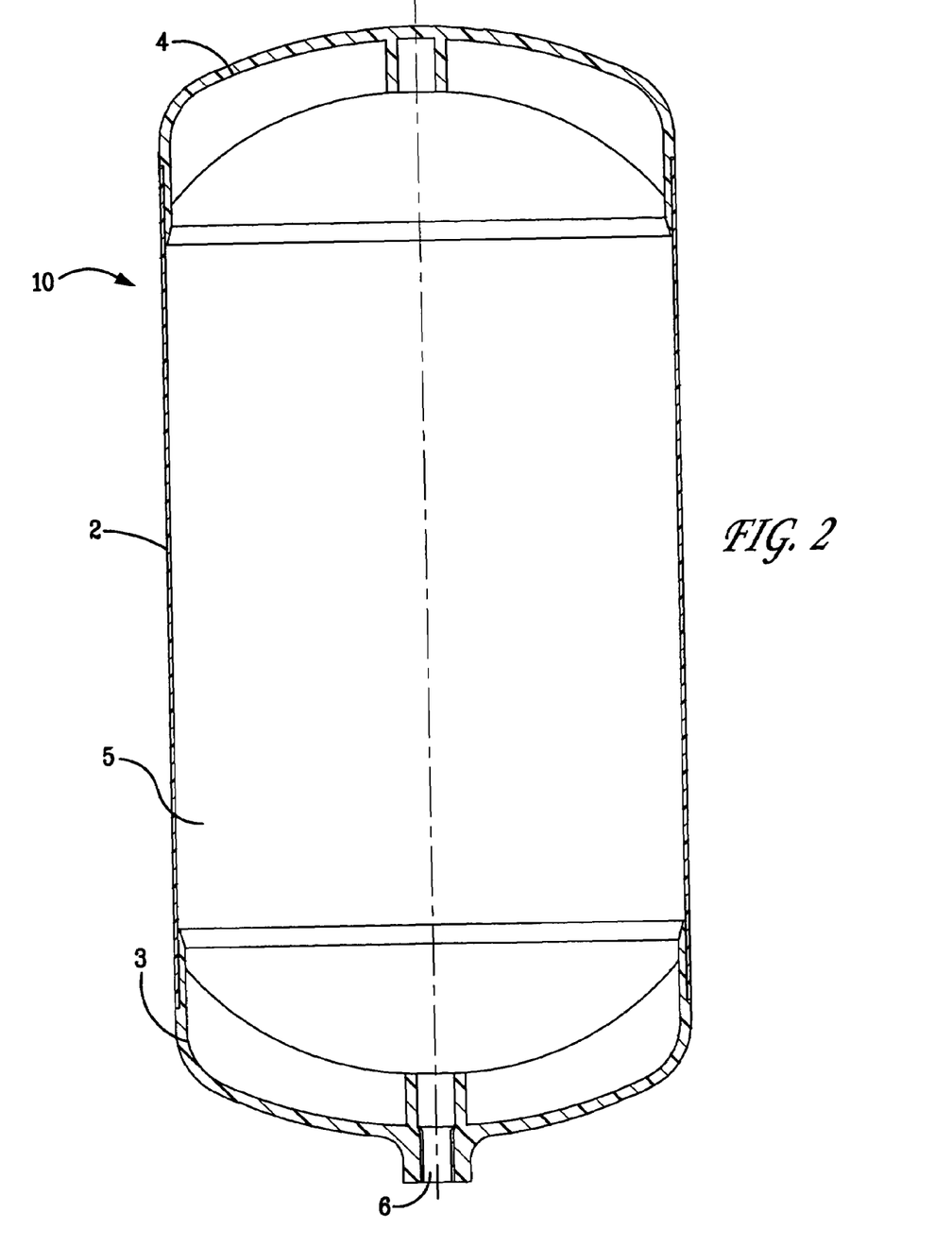

A schematic cross-section of the vessel according to the invention is shown according to a second embodiment, wherein the vessel 10 is composed of a tube 2 of fibre-plastics composite and two lids 3 and 4 of fibre-plastics composite, that are joined one to another such that they enclose a hollow space 5 provided for storage of the gas. The tube 2 that is sealed at both ends respectively with a lid 3 and 4, can be loaded and/or unloaded via a centrally arranged connector 6.

Figure 3:
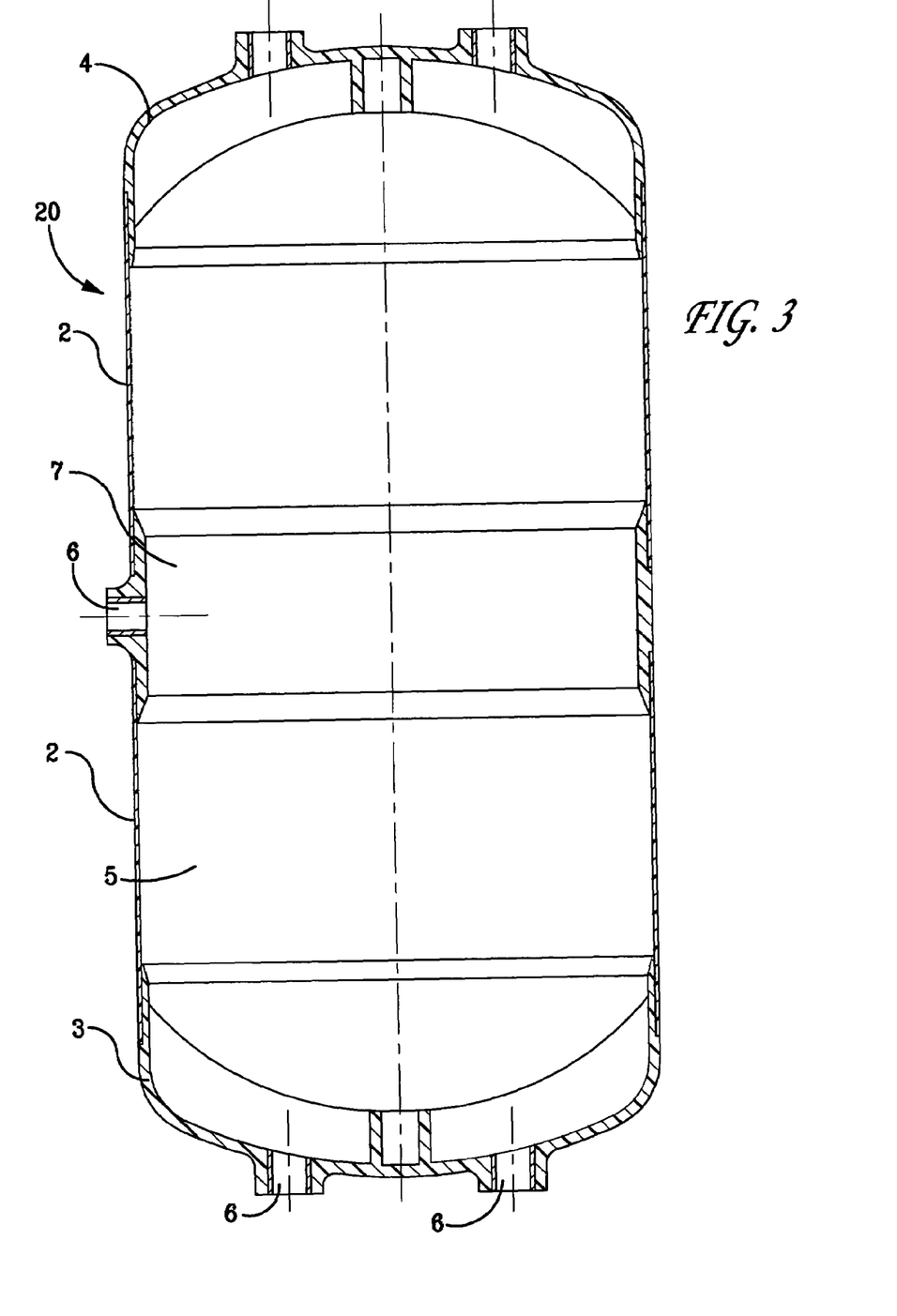

In FIG. 3 a schematic cross-section of the vessel according to the invention according to the third embodiment is shown, wherein the vessel 20 is configured from a tube 2 configured in two parts. An intermediate part 7 with a connector 6 for loading and/or unloading is connected to the tube 2. Two lids 3 and 4 are joined to the tube 2 and the intermediate part 7 such that they enclose a hollow space 5 provided for storage of the gas. Further connectors 6 for loading and/or unloading the container are located in the lid 3.

Figure 4:
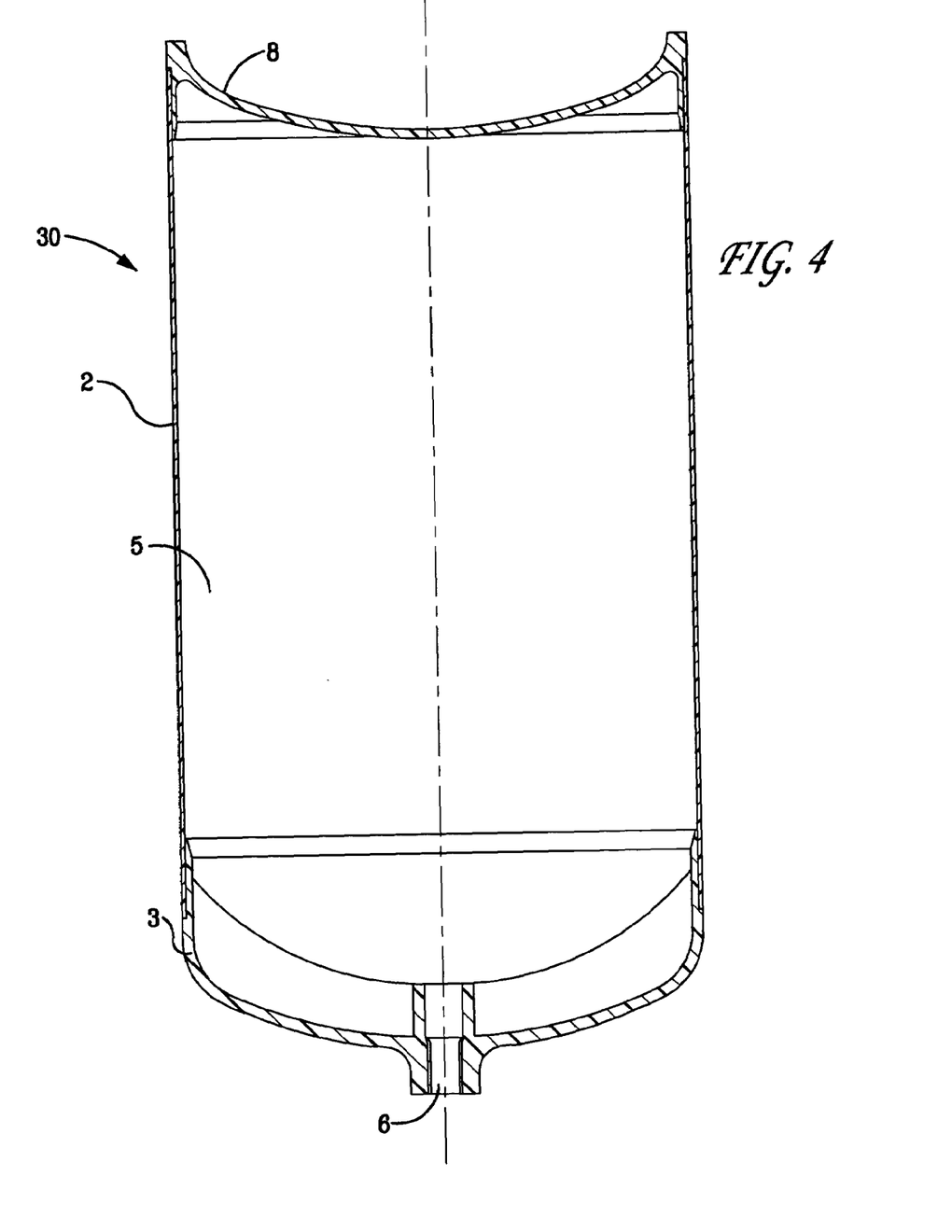

In FIG. 4 a schematic cross-sectional view of the vessel according to the invention is shown according to a fourth embodiment, wherein the vessel 30 is composed of a tube 2 of fibre-plastics composite and two lids 3 and 8 of fibre-plastics composite that are joined together such that they enclose a hollow space 5 for storage of the gas. The tube 2 that is sealed at the ends respectively with a lid 3 and 8 can be loaded and/or unloaded via a centrally arranged connector 6. The lid 8 is configured with a vessel bottom domed inwards.

As is further evident in FIGS. 1 to 3, the lids 3, 4 respectively have a tube connector 11. the external diameter of which is matched almost exactly to the internal diameter of the tube 2 and thus can be inserted in one end of the tube 2 in a telescopic manner. This tube connector 11 expands beyond the inserted portion in a spring-like manner to a larger diameter, preferably to the external diameter of the tube 2, so that it forms a shoulder that bears upon the end face of the tube, wherein the outside wall of the lid joins flush with the outside surface of the tube. The tube connector 11 of the lid protruding into the tube 2 has an axial length of typically 5–100 mm, preferably at least 50 mm, in order to be able to produce as large a gluing or welding connection surface area as possible between the tube connector 11 and respectively the lid 3, 4 and the tube 2.

FIG. 4 shows the variation with a lid domed inwards on one side, so that the external edge of this lid 8 can serve as a standing surface, the pressure vessel 1 overall being set at a position rotated by 4 to 180° on a support or respectively the base.

Figure 5:
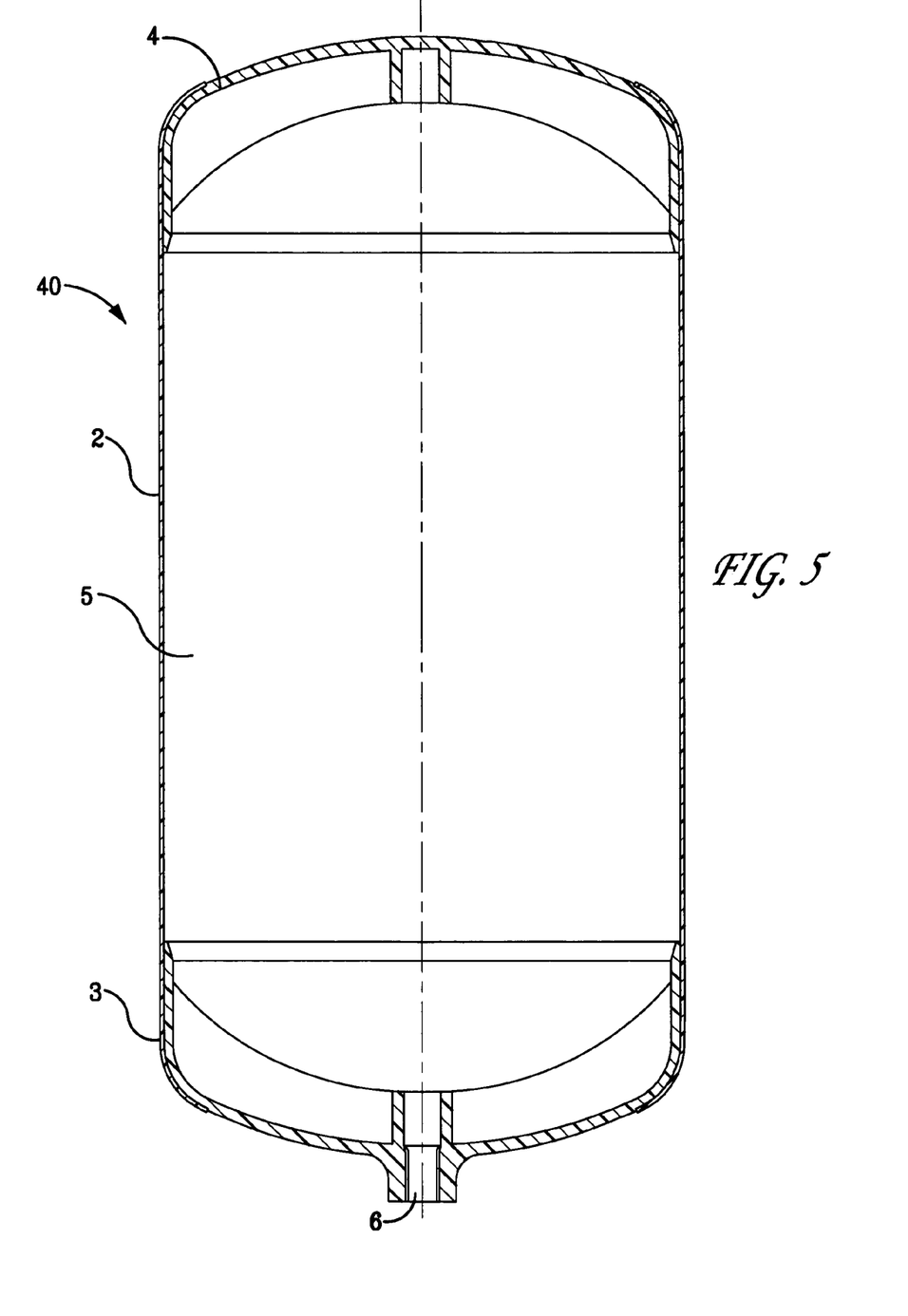

FIG. 5 shows a further variation of the joint between a tube 2 and lids 3, 4, wherein in this case the tube 2 is provided with inwardly curved free end faces that can be manufactured, for example, by thermal moulding, and wherein the lids are pressed from the inside against the inwardly protruding sections of the tube 2, and wherein in an analogous manner welding or gluing is then carried out between the outside wall of the lids 3, 4 and the inside wall of the tube 2. The lids can thus be inserted into the tube before the configuration of the inwardly turned tube ends; they can, however, also be inserted subsequently when the cross-section is elliptically deformed by compression on one side or "ovalising" of the tube 2, so that the lids 3, 4 can be inserted with one edge leading into the tube and then rotated into the desired position. A certain elastic deformability in the tube and/or the lid is therefore advantageous.

Figure 6:
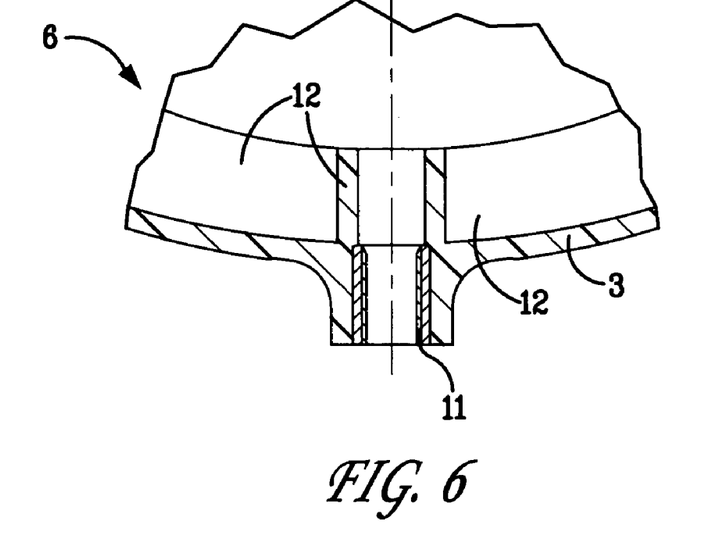
Figure 7:
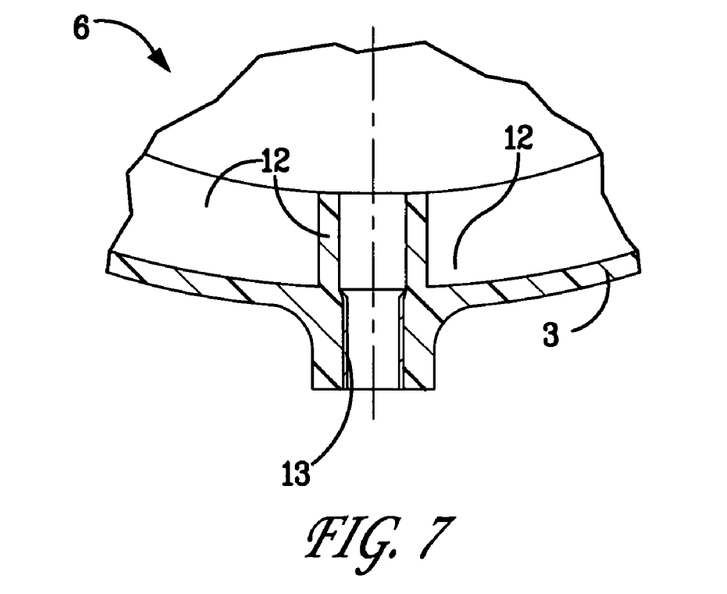

FIGS. 6 and 7 show in detail views the configuration of a connection piece either with an inserted thread piece 11 or with a thread 13 moulded into the connector. In addition, ribs 12 running in the longitudinal and crosswise direction (that is to say parallel to the plane of the paper and perpendicular thereto) are provided for reinforcing the lid 3 and respectively 4.

Figure 8:
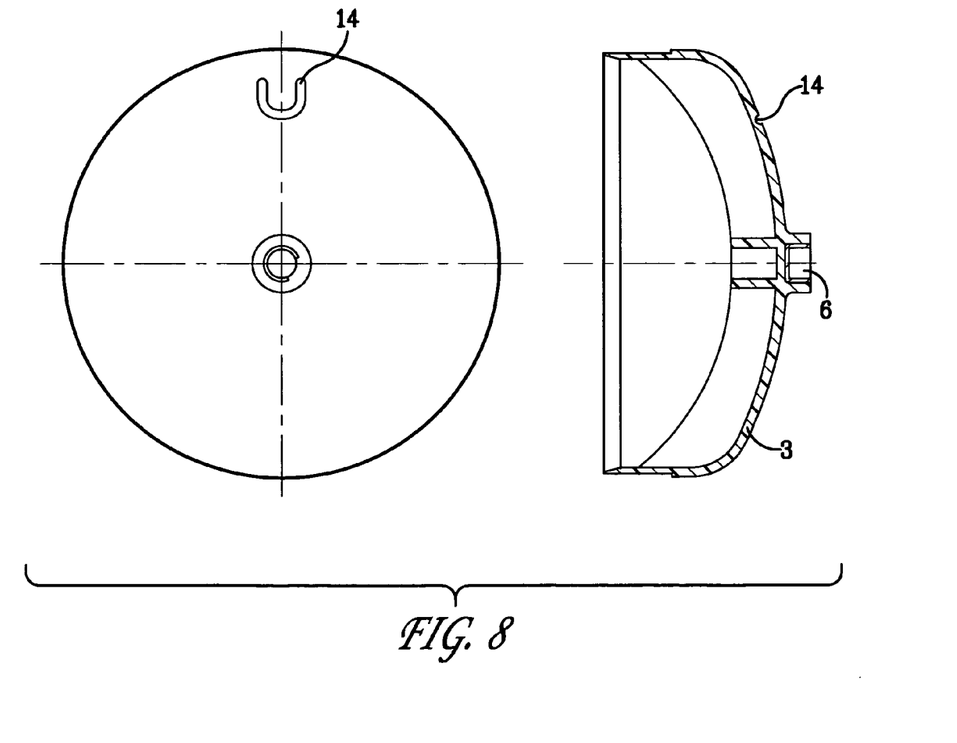

In FIG. 8 there is shown another pressure-relief joint 14 in the form of a U-shaped, groove-like indentation in the lid, that is to ensure that in the case of an over-pressure possibly occurring in the vessel, the medium escapes in a controlled manner through the pressure-relief joint, without the entire vessel exploding.

The invention claimed is:

1. Pressure vessel (1, 10, 20, 30, 40) for storage of solid, liquid and/or gaseous media under an operating pressure above atmospheric pressure, wherein the pressure vessel comprises:
    a single-layer tubular section (2), and
    lids which seal end faces of the single-layer tubular section, so that the single-layer tubular section and the lids enclose a hollow space provided for storage of the media, wherein at least one connector (6,6') is provided for loading/unloading,
    characterised in that said single-layer tubular section is composed of a single-layer tube, said single-layer tube being composed of fibre-reinforced thermoplastic material, said fibre-reinforced thermoplastic material of the single-layer tube containing more than 10 percent by volume of fibres with an average fibre length of more than 50 mm as reinforcement.

2. Pressure vessel according to claim 1, characterised in that the lids in turn comprise a fibre-reinforced plastic, wherein the lid material contains fibres, the average length of which is in the range between 1 and 30 mm.

3. Pressure vessel according to one of claim 1 or 2, characterised in that the matrix material of the vessel comprises a thermoplastic material, for example, polyethylene (PE), polypropylene (PP), polyamide (PA), polyketone (PK), polyvinyl chloride (PVC), poly-4-methylpentene-1 (PMP), polyacetal (polyoxymethylene) (POM), polymethyl methacrylate (PMMA), polystyrene (PS), styrene/acrylnitrile copolymer (SAN), polycarbonate (PC) and/or acrylnitrile butadiene styrene (ABS).

4. Pressure vessel according to one of claim 1 or 2, characterised in that organic or inorganic fibres, preferably glass fibres, aramide fibres, carbon fibres, metal fibres, ceramic fibres and/or polymer fibres are used as reinforcement.

5. Pressure vessel according to one of claim 1 or 2, characterised in that the single-layer tubular section has a circular cross-section.

6. Pressure vessel according to one of claim 1 or 2, characterised in that at least one of the lids is provided with a tubular connector that can be joined to one of the ends of the single-layer tubular section in a telescopic manner.

7. Pressure vessel according to claim 6, characterised in that the external diameter of the tube connector corresponds to the internal diameter of the single-layer tubular section (2).

8. Pressure vessel according to one of claim 1 or 2, characterised in that the fibres of the single-layer tubular section are on average more orientated in the peripheral direction than in the axial direction.

9. Pressure vessel according to claim 8, characterised in that the angle of orientation of the fibres determined parallel with respect to the tube axis in a quadrant between 0 and 90° is between 45° and 65°, preferably between 50° and 60°.

10. Pressure vessel according to one of claim 1 or 2, characterised in that the wall thickness of the tube is in the range between 1 mm and 10 mm.

11. Pressure vessel according to one of claim 1 or 2, characterised in that it is set up for operating pressures below 25 Mpa (250 bar), preferably for operating pressures below 6 Mpa (60 bar).

12. Pressure vessel according to claim 1 or 2, characterised in that the matrix material of the vessel comprises a thermoplastic material, for example, of polyethylene (PE), polypropylene (PP), polyamide (PA), polyketone (PK), polyvinyl chloride (PVC), poly-4-methylpentene-1 (PMP), polyacetal (polyoxymethylene) (POM), polymethyl methacrylate (PMMA), polystyrene (PS), styrene/acrylnitrile copolymer (SAN), polycarbonate (PC) and/or acrylnitrile butadiene styrene (ABS), that organic or inorganic fibres, preferably glass fibres, aramide fibres, carbon fibres, metal fibres, ceramic fibres and/or polymer fibres are used as reinforcement.

13. Pressure vessel according to claim 12, characterised in that the single-layer tubular section has a circular cross-section, and in that at least one of the lids is provided with a tubular connector that can be joined in a telescopic manner to one of the ends of the single-layer tubular section.

14. Pressure vessel according to claim 12, characterised in that the wall thickness of the single-layer tubular section is in the range between 1 mm and 10 mm.

15. Pressure vessel according to claim 12, characterised in that it is set up for operating pressures below 25 Mpa (250 bar), preferably for operating pressures below 6 Mpa (60 bar).

16. Pressure vessel (1, 10, 20, 30, 40) for storage of solid, liquid and/or gaseous media under an operating pressure above atmospheric pressure, wherein the pressure vessel comprises:
    a single-layer tubular section (2), and
    lids which seal end faces of the single-layer tubular section, so that the single-layer tubular section and the lids enclose a hollow space provided for storage of the media, wherein at least one connector (6,6') is provided for loading/unloading,
    characterised in that said single-layer tubular section is composed of a plurality of separate single-layer tubes and an intermediate piece, said plurality of single-layer tubes being joined to one another by means of the intermediate piece, said plurality of single-layer tube being composed of fibre-reinforced thermoplastic material, said fibre-reinforced thermoplastic material of the single-layer tube containing more than 10 percent by volume of fibres with an average fibre length of more than 50 mm as reinforcement.

* * * * *